(12) United States Patent
Wang

(10) Patent No.: US 10,877,250 B2
(45) Date of Patent: Dec. 29, 2020

(54) LENS ASSEMBLY

(71) Applicants: SINTAI OPTICAL (SHENZHEN) CO., LTD., ShenZhen (CN); ASIA OPTICAL CO., INC., Taichung (TW)

(72) Inventor: Chih-Peng Wang, Taichung (TW)

(73) Assignees: SINTAI OPTICAL (SHENZHEN) CO., LTD., Shenzhen (CN); ASIA OPTICAL CO., INC., Taichung (TW)

( * ) Notice: Subject to any disclaimer, the term of this patent is extended or adjusted under 35 U.S.C. 154(b) by 115 days.

(21) Appl. No.: 16/256,132

(22) Filed: Jan. 24, 2019

(65) Prior Publication Data

US 2019/0227285 A1 Jul. 25, 2019

(30) Foreign Application Priority Data

Jan. 24, 2018 (CN) .......................... 2018 1 0069020

(51) Int. Cl.
| | |
|---|---|
| G02B 13/00 | (2006.01) |
| G02B 9/60 | (2006.01) |
| G02B 25/00 | (2006.01) |
| G02B 13/22 | (2006.01) |
| G02B 27/01 | (2006.01) |

(52) U.S. Cl.
CPC .......... *G02B 13/0045* (2013.01); *G02B 9/60* (2013.01); *G02B 13/22* (2013.01); *G02B 25/001* (2013.01); *G02B 27/0172* (2013.01)

(58) Field of Classification Search
CPC ...... G02B 13/0045; G02B 13/22; G02B 9/60; G02B 25/001; G02B 27/0172

USPC .......................................................... 359/714
See application file for complete search history.

(56) References Cited

U.S. PATENT DOCUMENTS

| | | | | |
|---|---|---|---|---|
| 5,155,630 A | * | 10/1992 | Hata | G02B 15/173 359/685 |
| 5,903,400 A | * | 5/1999 | Endo | G02B 13/24 359/758 |
| 8,416,510 B2 | | 4/2013 | Kubota et al. | |
| 8,531,776 B2 | | 9/2013 | Peng et al. | |
| 2016/0299317 A1 | | 10/2016 | Ikegaya | |

FOREIGN PATENT DOCUMENTS

| | | |
|---|---|---|
| CN | 102455493 A | 5/2012 |
| CN | 102967921 A | 3/2013 |
| JP | 2012103319 A | 5/2012 |
| KR | 20170035006 A | 3/2017 |

\* cited by examiner

*Primary Examiner* — Thomas K Pham
*Assistant Examiner* — Mitchell T Oestreich
(74) *Attorney, Agent, or Firm* — Mark M. Friedman

(57) ABSTRACT

A lens assembly includes a first lens, a second lens, a third lens, a fourth lens, and a fifth lens arranged on an optical axis from an object side to an image side. The first lens is a meniscus lens having a negative refractive power. The second lens has a positive refractive power. The third lens has a positive refractive power, and has a convex image-side surface. The fourth lens has a positive refractive power. The fifth lens has a negative refractive power, and has a concave image-side surface. The lens assembly is formed compact, and has wide viewing angle and telecentric optical design.

20 Claims, 4 Drawing Sheets

LENS ASSEMBLY

FIELD OF DISCLOSURE

The present disclosure relates to a lens assembly, and in particular, to a lens assembly is formed compact, and has wide viewing angle and telecentric optical design.

BACKGROUND

A lens group of a digital projector applied to digital light processing (DLP) and liquid crystal on silicon (LCoS) can merge a combination interface and then can be further applied, for example, in augment reality (AR), virtual reality (VR), mixed reality (MR), or head up display (HUD). In this type of application, the combination interface is provided at a pupil aperture, and information is projected onto the combined interface by optical reflection principle, and then the information is projected into user's eyes through balanced reflection, thereby completing an optical system with a large field of view angle and infinity image distance.

However, the lens group currently applied to a front aperture and having a telecentric optical system architecture generally adopts a multi-group zoom design and is equipped with a spherical lens. Such a structure makes the lens group too bulky and is not conducive to miniaturization. Accordingly, it is necessary to provide a lens assembly to solve the technical problems in the prior art.

SUMMARY OF DISCLOSURE

The present disclosure provides a lens assembly to solve the above problems. The lens assembly is formed compact, and has wide viewing angle and telecentric optical design.

The lens assembly in accordance with the present disclosure, in sequence from an object side to an image side along an optical axis, comprises a first lens which is a meniscus lens with negative refractive power; a second lens having positive refractive power; a third lens having positive refractive power and including a convex surface facing the image side; a fourth lens having positive refractive power, and a fifth lens having negative refractive power and including a concave surface facing the image side, wherein the fourth lens and the fifth lens are cemented to form a cemented lens with negative refractive power.

In accordance with the present disclosure, the lens assembly includes an aperture and the aperture disposed between the object side and the first lens.

In accordance with the present disclosure, the first lens includes a concave surface facing the object side and a convex surface facing the image side.

In accordance with the present disclosure, the second lens includes a convex surface facing the object side and another convex surface facing the image side.

In accordance with the present disclosure, the third lens includes a convex surface facing the object side.

In accordance with the present disclosure, the fourth lens includes a convex surface facing the object side and another convex surface facing the image side, and the fifth lens includes a concave surface facing the object side.

In accordance with the present disclosure, the second lens includes a plane surface facing the object side and a convex surface facing the image side.

In accordance with the present disclosure, the lens assembly satisfies:

$$3.3 \leq \left| \frac{f_1}{EFL} \right| \leq 4.7,$$

wherein f1 is an effective focal length of the first lens, and EFL is an effective focal length of the lens assembly.

In accordance with the present disclosure, the lens assembly satisfies:

$$1.2 \leq \frac{IMG(H)}{f_\#} \leq 1.5,$$

wherein IMG(H) is an image height on the image plane of the lens assembly, and $f_\#$ is a F-number of the lens assembly.

In accordance with the present disclosure, the lens assembly satisfies:

$$1.7 \leq \frac{f_1}{f_{45}} \leq 3.2,$$

wherein f1 is an effective focal length of the first lens, and f45 is an effective focal length of the cemented lens, and the cemented lens are cemented by the fourth lens and the fifth lens.

In accordance with the present disclosure, the lens assembly satisfies: CRA≤1.4 degree, wherein the CRA is the maximum angle of a chief ray angle of an image height on an image plane from an optical axis.

In accordance with the present disclosure, the lens assembly satisfies:

$$1.4 \leq \left| \frac{f_{45}}{EFL} \right| \leq 2,$$

wherein $f_{45}$ is an effective focal length of the cemented lens, and the cemented lens are cemented by the fourth lens and the fifth lens, and EFL is an effective focal length of the lens assembly.

A detailed description is given in the following embodiments with reference to the accompanying drawings.

BRIEF DESCRIPTION OF DRAWINGS

The present disclosure can be more fully understood by reading the subsequent detailed description and examples with references made to the accompanying drawings, wherein.

DETAILED DESCRIPTION

The following description is made for the purpose of illustrating the general principles of the present disclosure and should not be taken in a limiting sense. The scope of the present disclosure is best determined by reference to the appended claims.

Figure 1:
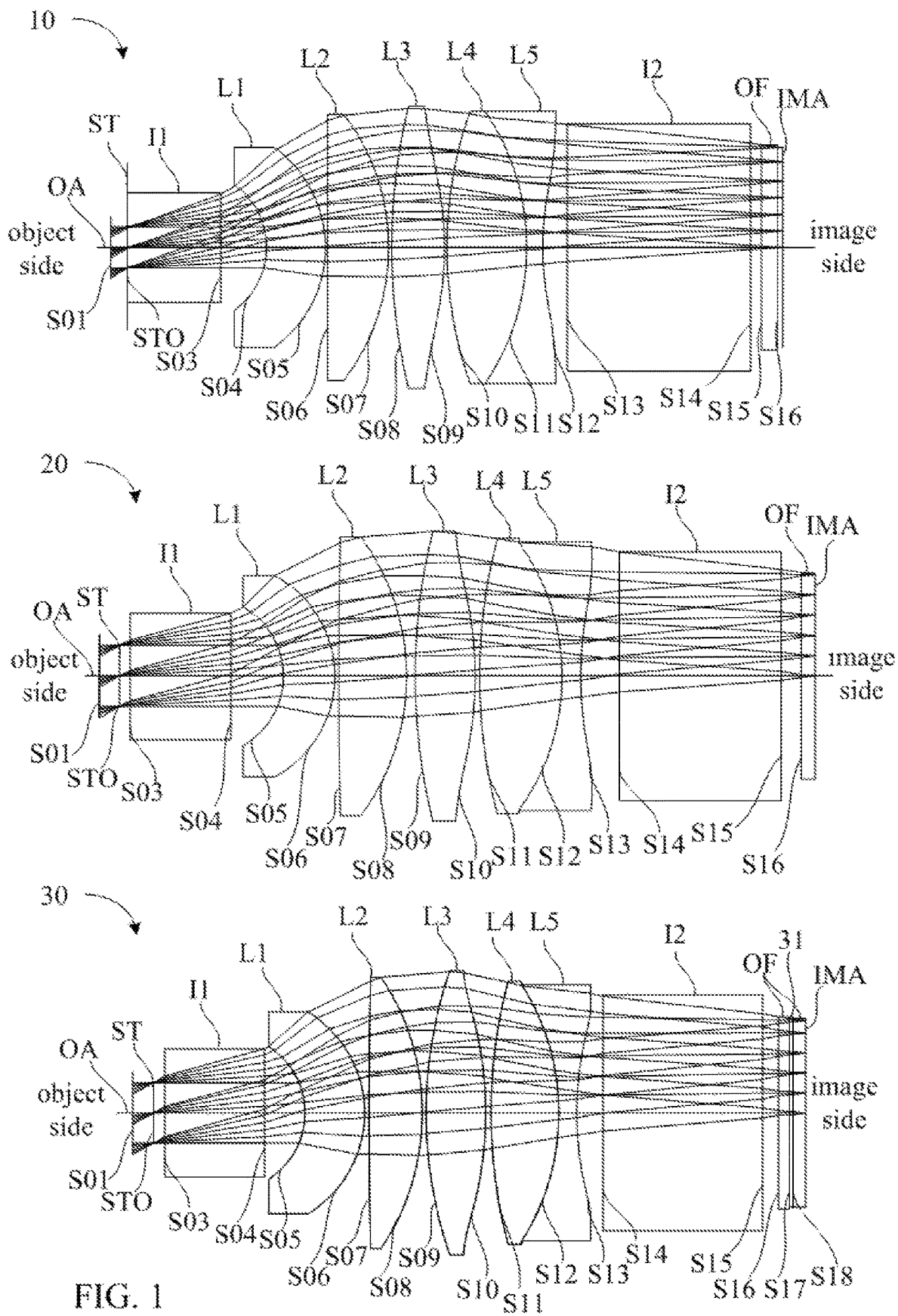
FIG. 1 is a lens layout and optical path diagram of a lens assembly in accordance with three embodiments of the present disclosure.

Referring to FIG. 1, FIG. 1 is a lens layout and optical path diagram of a lens assembly 10, 20 and 30 in accordance with a first, second and third embodiment of the present disclosure, respectively. Referring to FIG. 1, the lens assembly 10, 20 and 30 in sequence from an object side to an image side IMA along an optical axis OA, comprises a first lens L1, a second lens L2, a third lens L3, a fourth lens L4 and a fifth lens L5, the total number of lenses is five, wherein the lens assembly 10, 20 and 30 comprises an aperture ST, a first non-refractive medium I1, an optical filter OF and a second non-refractive medium 12, wherein the aperture and the first non-refractive medium I1 are disposed between the object side and the first lens L1, and the optical filter OF and a second non-refractive medium 12 are disposed between the fifth lens L5 and the image side IMA.

The aperture ST is used to limit the position and size of the relative aperture and is used as an entrance pupil position. In addition, the aperture ST can effectively shield and limit non-effective light, such as stray light, large angle incident light, and the like.

The first non-refractive medium I1 can effectively increase the distance between the aperture ST and the first lens L1 to achieve the purpose of elastically adjusting the optical path space. The material of the first non-refractive medium I1 is selected from glass.

The first lens L1 is a meniscus lens with negative refractive power and includes a concave surface facing the object side and a convex surface facing the image side. The first lens L1 can effectively diffuse the light beam to increase the optical path, and allows the first non-refractive medium I1 to be accommodated inside the lens assembly 10, 20 and 30. In the present disclosure, a better resolution effect can be obtained by employing a front aperture lens and a first lens L1 having a negative refractive power instead of a first lens having positive refractive power of the prior art.

The second lens L2 includes a convex surface facing the image side, wherein the object side of the second lens L2 is substantially planar, or a convex surface and close to the plane. The third lens L3 is a biconvex lens and the image side of the third lens L3 is aspherical. The second lens L2 and the third lens L3 both have positive refractive power, which can effectively shorten the focal length of the lens assembly 10, 20 and 30, and provide the overall refractive power of the lens assembly 10, 20 and 30.

The fourth lens L4 is a biconvex lens. The fifth lens L5 is a biconcave lens, and the image side of the fifth lens L5 is aspherical, and the image side of the fifth lens L5 has a recurve from the near optical axis OA to the edge. It's worth noting that the fourth lens L4 and the fifth lens L5 are cemented to form a cemented lens with negative refractive power, the image side of the fourth lens L4 and the object side of the fifth lens L5 are cemented to form a surface. In the present disclosure, by providing a cemented lens cemented of a fourth lens L4 and a fifth lens L5, not only the dispersion can be effectively eliminated, but also the telecentric optical path of the optical system can be appropriately adjusted, thereby effectively shortening the total length of the optical system, then the lens assembly 10, 20 and 30 are to achieve the effect of a short focus, so that the lens assembly 10, 20 and 30 can be miniaturized.

The second non-refractive medium 12 can effectively increase the distance between the fifth lens L5 and the image side IMA to achieve the purpose of elastically adjusting the optical path space. The material of the second non-refractive medium 12 is selected from glass.

Herein, the object side surface and the image side surface of the lens refer to the object side surface and the image side surface at the near optical axis unless otherwise specified. Also, the object side surface of the lens refers to the surface of the lens near the object side of the lens assembly, and the image side surface of the lens refers to the surface of the lens near the image side of the lens assembly. In addition, a lens with negative refractive power means that when parallel light pass through the lens, the light will diverge away from the optical axis, and a lens with positive refractive power means that when parallel light pass through the lens, the light will converge near the optical axis, and non-refractive media means that when parallel light pass through the medium, the light does not turn and stays straight.

In the present disclosure, the first lens L1 of the lens assembly 10, 20 and 30 at least satisfies one of the following conditions (1):

$$3.3 \leq \left|\frac{f_1}{EFL}\right| \leq 4.7 \qquad (1)$$

wherein f1 is an effective focal length of the first lens L1, and EFL is an effective focal length of the lens assembly 10, 20 and 30. In this condition, the first lens L1 can effectively diffuse the light beam and thereby increase the optical path, so that a better resolution effect can be obtained.

Further, in the present disclosure, the cemented lens is cemented by the fourth lens L4 and the fifth lens L5 of the lens assembly 10, 20 and 30 at least satisfies also one of the following conditions (2):

$$1.4 \leq \left|\frac{f_{45}}{EFL}\right| \leq 2 \qquad (2)$$

wherein $f_{45}$ is an effective focal length of the cemented lens, and the cemented lens is cemented by the fourth lens L4 and the fifth lens L5, and EFL is an effective focal length of the lens assembly 10, 20 and 30. In this condition, not only the dispersion can be effectively eliminated, but also the telecentric optical path of the optical system can be appropriately adjusted, thereby effectively shortening the total length of the optical system, then the lens assembly 10, 20 and 30 are to achieve the effect of a short focus, so that the lens assembly 10, 20 and 30 can be miniaturized.

Beside, in the present disclosure, the lens assembly 10, 20 and 30 at least satisfies one of the following conditions (3):

$$1.2 \leq \frac{IMG(H)}{f_\#} \leq 1.5 \qquad (3)$$

wherein IMG(H) is an image height on the image plane of the lens assembly 10, 20 and 30, and $f_\#$ is a F-number of the lens assembly 10, 20 and 30. With this condition, it is possible to realize the characteristics that the lens assembly 10, 20 and 30 has a wide viewing angle. It can be understood that when $$\frac{IMG(H)}{f_{\#}} > 1$$

in the lens assembly 10, 20 and 30, the lens assembly 10, 20 and 30 has a wide-angle effect, and the larger the value, the larger the angle of the angle of view.

Further, in order to provide the lens assembly 10, 20 and 30 with better optical characteristics, the first lens L1, the fourth lens L4, and the fifth lens L5 of the lens assembly 10, 20 and 30 satisfy the following conditions (4) to maintain optical performance.

$$1.7 \leq \frac{f_1}{f_{45}} \leq 3.2 \quad (4)$$

wherein $f_1$ is an effective focal length of the first lens L1, and $f_{45}$ is an effective focal length of the cemented lens, and the cemented lens are cemented by the fourth lens L4 and the fifth lens L5.

Further, the lens assembly 10, 20 and 30 also satisfy the following conditions (5).

CRA≤1.4 degree (5)

wherein the CRA is the maximum angle of a chief ray angle of an image height on an image plane from an optical axis. That means the maximum of the chief ray angle of the lens assembly 10, 20 and 30 is less than or equal to 1.4 degrees. It can be understood that when the CRA value is closer to 0, the closer the lens assembly is to the telecentric optical design, the better the brightness and color uniformity of the image displayed by the lens assembly, and vice versa. Therefore, by designing the lens assembly to satisfy this condition (5), it is possible to effectively ensure that the lens assembly has the characteristics of telecentric optical design.

When the lens assembly 10, 20 and 30 satisfies at least one of the conditional expressions (1) to (5) described above, the lens assembly has a characterized of the miniaturization, wide viewing angle, and telecentric optical design.

The lens assembly 10, 20 and 30 of the present disclosure will be further described in detail below with reference to three specific embodiments. Referring to FIG. 1, there are shown a lens assembly 10 of the first embodiment, a lens assembly 20 of the second embodiment, and a lens assembly 30 of the third embodiment, respectively.

In addition, the shape of the aspherical lens can be expressed by:

$$D = \frac{C \cdot H^2}{1 + \sqrt{1 - (1+K) \cdot C^2 \cdot H^2}} + E_4 H^4 + E_6 H^6 + E_8 H^8 + E_{10} H^{10} + E_{12} H^{12} + E_{14} H^{14} + E_{16} H^{16}$$

Where D represents the amount of sags of the aspherical lens at a relative height from the optical axis of the lens, C represents the reciprocal of the paraxial radius of curvature, H represents the relative height of the aspherical lens from the optical axis of the lens, and K represents a conic constant of the aspherical lens, and E4~E16 is fourth order or more of the even-order aspheric correction factor.

The First Embodiment

Referring to FIG. 1, there is shown a schematic view of the lens assembly in accordance with three embodiments of the present disclosure, wherein the lens assembly 10 is the first embodiment. In the first embodiment, the lens assembly 10 in sequence from an object side to an image side IMA along an optical axis OA, comprises an aperture ST, a first non-refractive medium I1, a first lens L1, a second lens L2, a third lens L3, a fourth lens L4, a fifth lens L5, a second non-refractive medium I2, an optical filter OF and the image side IMA, wherein the structures and features of the above-mentioned elements are generally described above, and are not described herein. It should be noted that, in the first embodiment, a position of the aperture ST is on the object side surface of the non-refractive medium I1, and the image side IMA is disposed at a distance from the image side surface of the optical filter OF. Preferably, the materials of the first lens L1 to the fifth lens L5, the first non-refractive power media I1 and the second non-refractive power media I2 are selected from glass.

Referring to TABLE 1, the optical specifications of the lens assembly 10 of the first embodiment. TABLE 1 shows that an effective focal length (EFL), back focal length (BFL, the distance from the image side surface of the fifth lens L5 to the imaging side IMA on the optical axis), F-number ($f_{\#}$ for short), total track length (TTL), field of view (FOV) and image height on the image plane of the lens assembly (IMG (H), radius) is equal to 12.2 mm, 1.5 mm, 4.88, 40.41 mm, 62 mm and 6 mm respectively.

TABLE 1

Effective Focal Length (EFL) = 12.2 mm
Back Focal Length (BFL) = 1.5 mm
F-number ($f_{\#}$) = 4.88
Total Track Length (TTL) = 40.41 mm
Field Of View (FOV) = 62 mm
IMG (H, radius) = 6 mm

| Surface | Radius of Curvature (mm) | Thickness (mm) | Nd | Vd | Remark |
|---|---|---|---|---|---|
| OBJ | ∞ | ∞ | | | |
| S01 | ∞ | 1 | | | |
| STO | ∞ | 5.6 | 1.517 | 64.167 | The first non-refractive power media I1 |
| S03 | ∞ | 2.75 | | | |
| S04 | −4.74545 | 3.54 | 1.883 | 40.765 | The first lens L1 |
| S05 | −7.35965 | 0.15 | | | |
| S06 | ∞ | 3.67 | 1.595 | 67.736 | The second lens L2 |
| S07 | −13.1827 | 0.15 | | | |
| S08 | 36.86341 | 3.2 | 1.595 | 67.736 | The third lens L3 |
| S09 | −16.5142 | 0.15 | | | |
| S10 | 24.77519 | 4.8 | 1.595 | 67.736 | The fourth lens L4 |
| S11 | −14.9219 | 0.95 | 1.805 | 25.432 | The fifth lens L5 |
| S12 | 14.01807 | 1.5 | | | |
| S13 | ∞ | 11 | 1.717 | 29.513 | The second non-refractive medium I2 |
| S14 | ∞ | 0.65 | | | |
| S15 | ∞ | 1 | 1.517 | 64.167 | Optical filter OF |
| S16 | ∞ | 0.3 | | | |
| IMA | ∞ | 0 | 1.52 | 64 | |

Table 2 is related parameters of an aspherical surface of the image side surface S09 of the third lens L3 and the image side surface S 12 of the fifth lens L5 in Table 1.

TABLE 2

| Surface | K | E4 | E6 | E8 | E10 | E12 |
|---|---|---|---|---|---|---|
| S09 | 0 | 0.000319 | −2.58E−06 | 2.59E−08 | −2.19E−10 | 1.26E−12 |
| S12 | 0 | −0.0006 | 4.43E−06 | −2.63E−08 | 0 | 0 |

For the lens assembly 10 of the first embodiment, the total track length (TTL) which is from the object side of the first lens L1 to the image side IMA along an optical axis OA is 40.41 mm, the effective focal length (EFL) is 12.2 mm, the back focal length (BFL) which is from the image side surface of the fifth lens L5 to the imaging side IMA along the optical axis OA is 1.5 mm, the field of view (FOV) is 62 mm, the image height on the image plane of the lens assembly (IMG (H), radius) is 6 mm, a $f_1$ which is an effective focal length of the first lens L1 is −41.43 mm, a $f_2$ which is an effective focal length of the second lens L2 is 22.08 mm, $f_3$ which is an effective focal length of the third lens L3 is 19.54 mm, $f_{45}$ which is an effective focal length of the combination of the fourth lens L4 and the fifth lens L5 is −23.45 mm. It can be understood that, in the first embodiment, $$\left|\frac{f_1}{EFL}\right| = 3.396, \left|\frac{f_{45}}{EFL}\right| = 1.922, \frac{IMG(H)}{f_\#} = 1.230, \frac{f_1}{f_{45}} = 1.767,$$

and CRA<1.34 degree, and the imaging side IMA is within 0.9 image heights, therefore, the characteristics of the lens assembly 10 of the first embodiment satisfy the above conditional expressions (1) to (5), the lens assembly 10 has a characterized of the miniaturization, wide viewing angle, and telecentric optical design.

Further, in the first embodiment, it is known from $$\left|\frac{f_{45}}{EFL}\right| = 1.922$$

that the cemented lens which are cemented by the fourth lens L4 and the fifth lens L5 can exerts a good short-focus effect.

Figure 2A:
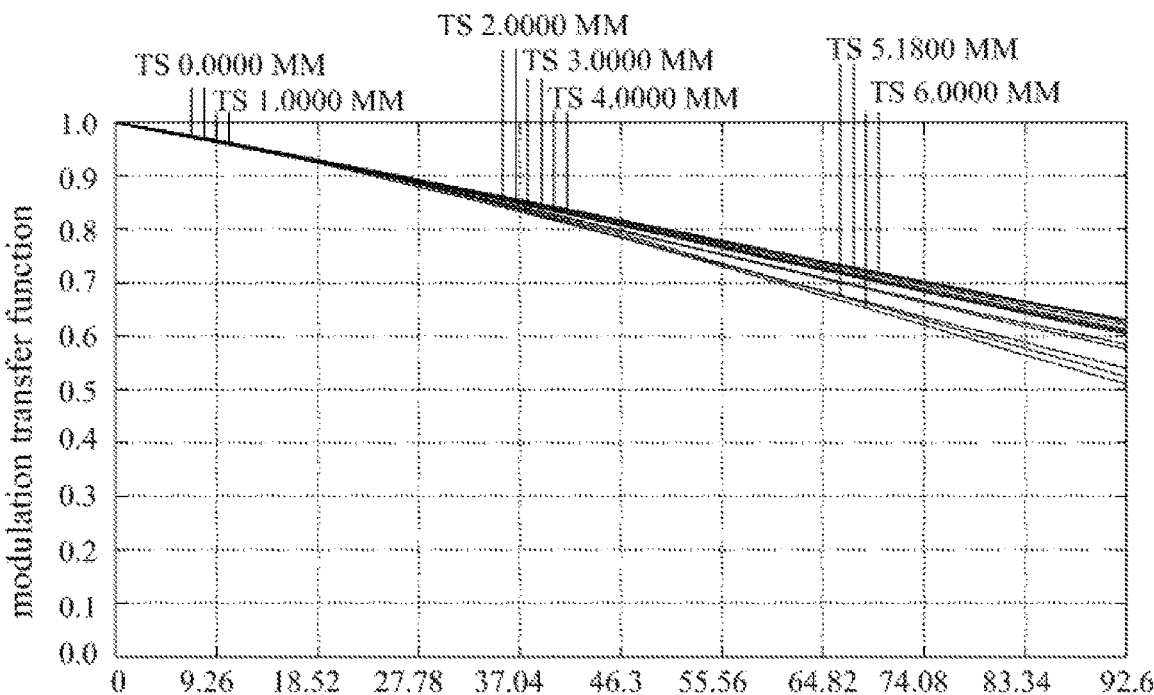
FIGS. 2A and 2B are a modulation transfer function (MTF) diagram and a lateral color diagram of a lens assembly in accordance with the first embodiment of the present disclosure, respectively.
Figure 2B:
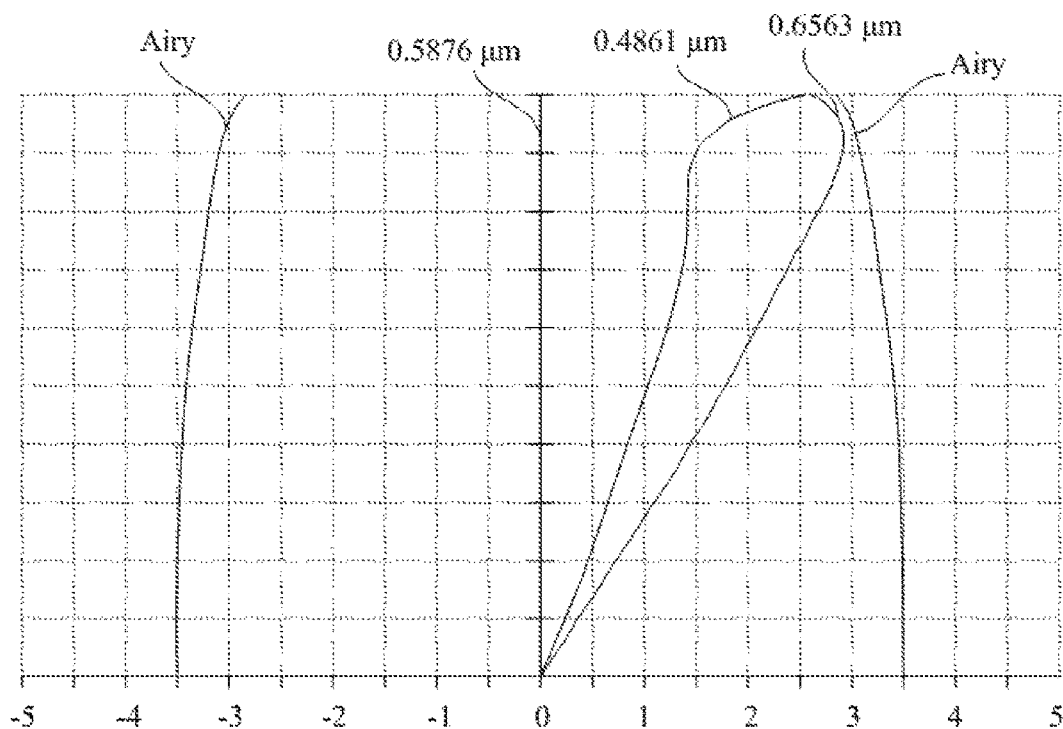

By the above arrangements of the lenses, the lens assembly 10 of the first embodiment can meet the requirements of optical performance as seen in FIGS. 2A-2B, wherein FIG. 2A shows a modulation transfer function (MTF) diagram of the lens assembly 10 of the first embodiment and FIG. 2B shows a lateral color diagram of the lens assembly 10 of the first embodiment.

In FIG. 2A, this is a zero-symmetric system, and only the portion of the modulation transfer function whose value is positive is shown in the figure, and the portion where the value is negative is not shown. It should be noted that the higher the value (vertical axis) of the modulation transfer function, the better the resolution effect. As can be seen from FIG. 2A, the lens assembly 10 of the first embodiment has a wavelength range of 0.4861 μm to 0.6563 μm, in the direction of the tangential (abbreviated as "T" in the figure) and the sagittal (abbreviated as "S" in the figure) respectively, the height of the field of view is 0.0000 mm, 1.0000 mm, 2.0000 mm, 3.0000 mm, 4.0000 mm, 5.1800 mm and 6.0000 mm, and the modulation transfer function with a spatial frequency between 0 lp/mm and 92.6 lp/mm is between 0.5 and 1.0. Further, in FIG. 2B, the line graphs on the left and right sides are the ranges calculated by the system simulation (−3.5 μm to 3.5 μm), and the horizontal axis indicates the state in which the plane colors are separated. As can be seen from FIG. 2B, the lens assembly 10 of the first embodiment has a wavelength of 0.587562 μm as a reference wavelength, the lateral chromatic aberration of 0.5876 μm, 0.4861 μm, and 0.6563 μm of a light with the height of the field of view between 0 mm and 6 mm is between −3.5 μm and 3.5 μm. Obviously, the lateral chromatic aberration of the lens assembly 10 of the first embodiment can be corrected effectively, and the image resolution can meet the requirements, thereby capable of obtaining good optical performance.

The Second Embodiment

Referring to FIG. 1, there is shown a schematic view of the lens assembly in accordance with three embodiments of the present disclosure, wherein the lens assembly 20 is the second embodiment. In the second embodiment, the lens assembly 20 in sequence from an object side to an image side IMA along an optical axis OA, comprises an aperture ST, a first non-refractive medium I1, a first lens L1, a second lens L2, a third lens L3, a fourth lens L4, a fifth lens L5, a second non-refractive medium I2, an optical filter OF and the image side IMA, wherein the structures and features of the above-mentioned elements are generally described above, and are not described herein. It should be noted that, in the second embodiment, the aperture ST is disposed at a distance from the object side of the non-refractive medium I1, and a position of the image side IMA is on the image side surface of the optical filter OF. Preferably, the materials of the first lens L1 to the fifth lens L5, the first non-refractive power media I1 and the second non-refractive power media I2 are selected from glass.

Referring to TABLE 3, the optical specifications of the lens assembly 20 of the second embodiment. TABLE 3 shows that an effective focal length (EFL), back focal length (BFL, the distance from the image side surface of the fifth lens L5 to the imaging side IMA on the optical axis), F-number ($f_\#$ for short), total track length (TTL), field of view (FOV) and image height on the image plane of the lens assembly (IMG (H), radius) is equal to 11 mm, 1.905 mm, 3.66, 35.38 mm, 58 mm and 5.2 mm respectively.

TABLE 3

Effective Focal Length (EFL) = 11 mm
Back Focal Length (BFL) = 1.905 mm
F-number ($f_\#$) = 3.66
Total Track Length (TTL) = 35.38 mm
Field Of View (FOV) = 58 mm
IMG (H, radius) = 5.2 mm

| Surface | Radius of Curvature (mm) | Thickness (mm) | Nd | Vd | Remark |
|---|---|---|---|---|---|
| OBJ | ∞ | ∞ | | | |
| S01 | ∞ | 1 | | | |
| STO | ∞ | 0.5 | | | |
| S03 | ∞ | 5 | 1.8466 | 23.825 | The first non-refractive power media I1 |
| S04 | ∞ | 2.6 | | | |
| S05 | −3.9657 | 2.536 | 1.883 | 40.765 | The first lens L1 |
| S06 | −5.666 | 0.2 | | | |
| S07 | 410.2007 | 3.346 | 1.595 | 67.736 | The second lens L2 |
| S08 | −11.8397 | 0.397 | | | |
| S09 | 30.2471 | 3 | 1.595 | 67.736 | The third lens L3 |
| S10 | −14.0684 | 0.2 | | | |
| S11 | 26.8664 | 4.096 | 1.595 | 67.736 | The fourth lens L4 |
| S12 | −11.5139 | 0.9 | 1.805 | 25.432 | The fifth lens L5 |
| S13 | 12.2664 | 1.905 | | | |
| S14 | ∞ | 8 | 1.8466 | 23.825 | The second non-refractive medium I2 |
| S15 | ∞ | 1 | | | |
| S16 | ∞ | 0.7 | 1.523 | 58.571 | Optical filter OF |
| IMA | ∞ | 0 | | | |

Table 4 is related parameters of an aspherical surface of the image side surface S10 of the third lens L3 and the image side surface S13 of the fifth lens L5 in Table 3.

TABLE 4

| Surface | K | E4 | E6 | E8 | E10 | E12 |
|---|---|---|---|---|---|---|
| S10 | 0 | 0.00056944 | −6.98E−06 | 9.05E−08 | −6.62E−10 | 3.65E−12 |
| S13 | −0.29002 | −0.001092496 | 1.51E−05 | −2.08E−07 | 1.26E−09 | 0 |

For the lens assembly 20 of the second embodiment, the total track length (TTL) which is from the object side of the first lens L1 to the image side IMA along an optical axis OA is 35.38 mm, the effective focal length (EFL) is 11 mm, the back focal length (BFL) which is from the image side surface of the fifth lens L5 to the imaging side IMA along the optical axis OA is 1.905 mm, the field of view (FOV) is 58 mm, the image height on the image plane of the lens assembly (IMG (H), radius) is 5.2 mm, a $f_1$ which is an effective focal length of the first lens L1 is −49.872 mm, a $f_2$ which is an effective focal length of the second lens L2 is 19.33 mm, $f_3$ which is an effective focal length of the third lens L3 is 16.5 mm, $f_{45}$ which is an effective focal length of the combination of the fourth lens L4 and the fifth lens L5 is −17.35 mm. It can be understood that, in the second embodiment, $$\left|\frac{f_1}{EFL}\right| = 4.534, \left|\frac{f_{45}}{EFL}\right| = 1.577, \frac{IMG(H)}{f_\#} = 1.421, \frac{f_1}{f_{45}} = 2.874,$$

and CRA<1.33 degree, and the imaging side IMA is within 0.9 image heights, therefore, the characteristics of the lens assembly 20 of the second embodiment satisfy the above conditional expressions (1) to (5), the lens assembly 20 has a characterized of the miniaturization, wide viewing angle, and telecentric optical design.

Further, in the second embodiment, it is known from $$\left|\frac{f_{45}}{EFL}\right| = 1.577$$

that the cemented lens which are cemented by the fourth lens L4 and the fifth lens L5 can exerts a good short-focus effect. In addition, in the second embodiment, it is known from $$\frac{IMG(H)}{f_\#} = 1.421$$

that the value is the largest compared to the other embodiments, that is, the lens assembly 20 of the second embodiment has a wide viewing angle characteristic superior to the other embodiments.

Figure 3A:
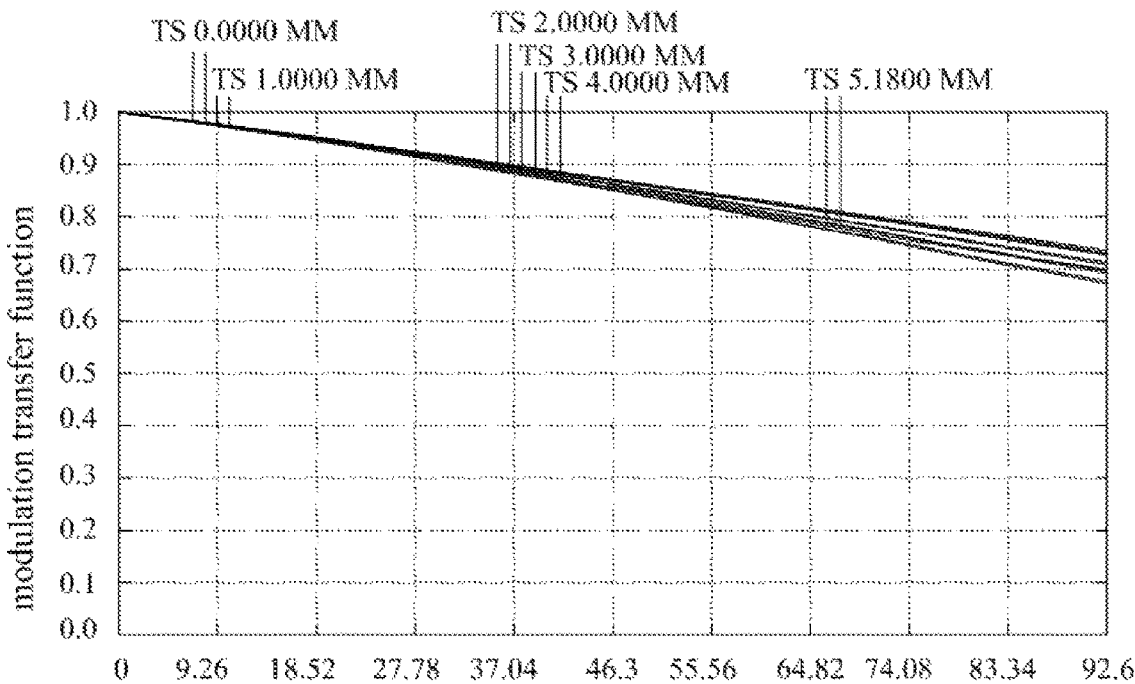
FIGS. 3A and 3B are a modulation transfer function (MTF) diagram and a lateral color diagram of a lens assembly in accordance with the second embodiment of the present disclosure, respectively.
Figure 3B:
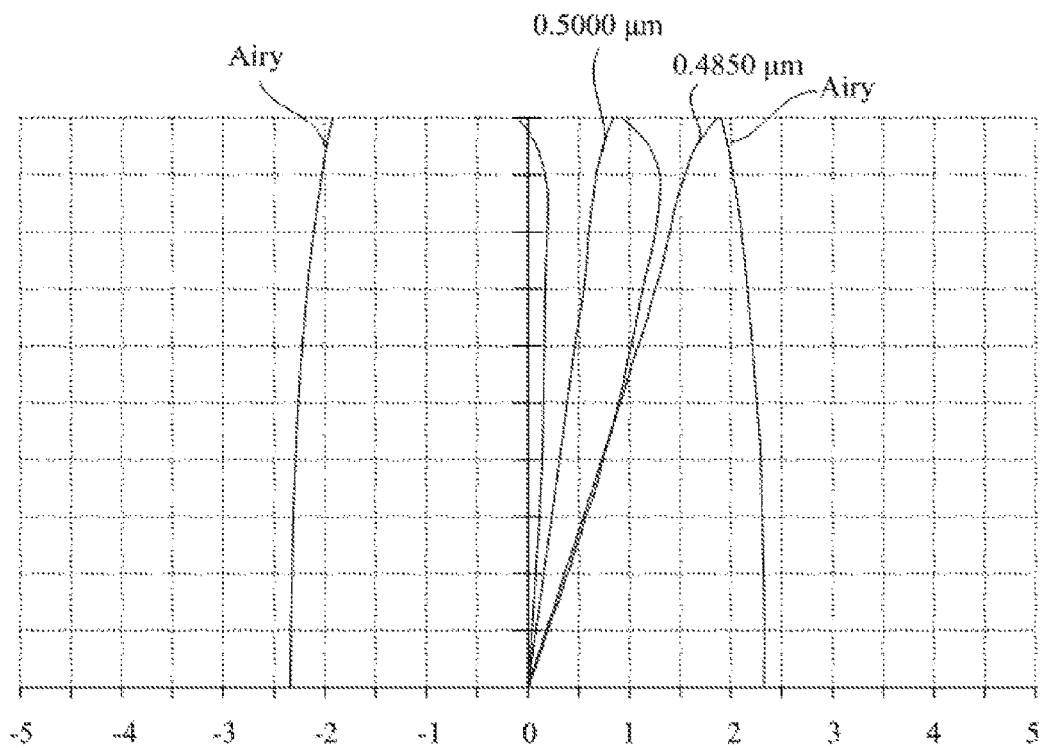

By the above arrangements of the lenses, the lens assembly 20 of the second embodiment can meet the requirements of optical performance as seen in FIGS. 3A-3B, wherein FIG. 3A shows a modulation transfer function (MTF) diagram of the lens assembly 20 of the second embodiment and FIG. 3B shows a lateral color diagram of the lens assembly 20 of the second embodiment.

In FIG. 3A, this is a zero-symmetric system, and only the portion of the modulation transfer function whose value is positive is shown in the figure, and the portion where the value is negative is not shown. It should be noted that the higher the value (vertical axis) of the modulation transfer function, the better the resolution effect. As can be seen from FIG. 3A, the lens assembly 20 of the second embodiment has a wavelength range of 0.4861 μm to 0.6563 μm, in the direction of the tangential (abbreviated as "T" in the figure) and the sagittal (abbreviated as "S" in the figure) respectively, the height of the field of view is 0.0000 mm, 1.0000 mm, 2.0000 mm, 3.0000 mm, 4.0000 mm and 5.1800 mm, and the modulation transfer function with a spatial frequency between 0 lp/mm and 92.6 lp/mm is between 0.6 and 1.0. Further, in FIG. 3B, the line graphs on the left and right sides are the ranges calculated by the system simulation (−2.5 μm to 2.5 μm), and the horizontal axis indicates the state in which the plane colors are separated. As can be seen from FIG. 3B, the lens assembly 20 of the second embodiment has a wavelength of 0.587562 μm as a reference wavelength, the lateral chromatic aberration of 0.5000 μm and 0.4850 μm of a light with the height of the field of view between 0 mm and 6 mm is between −2.5 μm and 2.5 μm. Obviously, the lateral chromatic aberration of the lens assembly 20 of the second embodiment can be corrected effectively, and the image resolution can meet the requirements, thereby capable of obtaining good optical performance.

The Third Embodiment

Referring to FIG. 1, there is shown a schematic view of the lens assembly in accordance with three embodiments of the present disclosure, wherein the lens assembly 30 is the third embodiment. In the third embodiment, the lens assembly 30 in sequence from an object side to an image side IMA along an optical axis OA, comprises an aperture ST, a first non-refractive medium I1, a first lens L1, a second lens L2, a third lens L3, a fourth lens L4, a fifth lens L5, a second non-refractive medium I2, an optical filter OF and the image side IMA, wherein the structures and features of the above-mentioned elements are generally described above, and are not described herein. It should be noted that, in the third embodiment, the aperture ST is disposed at a distance from the object side of the non-refractive medium I1, and a position of the image side IMA is on the image side surface of the optical filter OF, wherein the optical filter OF is composed of two optical filters, and the two optical filters are bonded by an adhesive, that is to say, an adhesive layer 31 is contained in the middle of the filter OF. Preferably, the materials of the first lens L1 to the fifth lens L5, the first non-refractive power media I1 and the second non-refractive power media I2 are selected from glass.

Referring to TABLE 5, the optical specifications of the lens assembly 30 of the third embodiment. TABLE 5 shows that an effective focal length (EFL), back focal length (BFL, the distance from the image side surface of the fifth lens L5 to the imaging side IMA on the optical axis), F-number ($f_\#$ for short), total track length (TTL), field of view (FOV) and image height on the image plane of the lens assembly (IMG (H), radius) is equal to 10 mm, 1.289 mm, 3.329, 33.61 mm, 58 mm and 4.7 mm respectively.

TABLE 5

Effective Focal Length (EFL) = 10 mm
Back Focal Length (BFL) = 1.289 mm
F-number ($f_\#$) = 3.329
Total Track Length (TTL) = 33.61 mm
Field Of View (FOV) = 58 mm
IMG (H, radius) = 4.7 mm

| Surface | Radius of Curvature (mm) | Thickness (mm) | Nd | Vd | Remark |
|---|---|---|---|---|---|
| OBJ | ∞ | ∞ | | | |
| S01 | ∞ | S1 | | | |
| STO | ∞ | 0.6 | | | |
| S03 | ∞ | 5 | 1.8466 | 23.825 | The first non-refractive power media I1 |
| S04 | ∞ | 2 | | | |
| S05 | −3.933 | 3 | 1.816 | 46.62 | The first lens L1 |
| S06 | −5.891 | 0.2 | | | |
| S07 | 333.8921 | 2.635 | 1.595 | 67.736 | The second lens L2 |
| S08 | −12.3991 | 0.2 | | | |
| S09 | 21.59 | 3 | 1.595 | 67.736 | The third lens L3 |
| S10 | −12.0947 | 0.288 | | | |
| S11 | 26.3426 | 3.362 | 1.595 | 67.736 | The fourth lens L4 |
| S12 | −12.1237 | 0.9 | 1.805 | 25.432 | The fifth lens L5 |
| S13 | 10.3642 | 1.289 | | | |
| S14 | ∞ | 8 | 1.8466 | 23.825 | The second non-refractive medium I2 |
| S15 | ∞ | 0.8 | | | |
| S16 | ∞ | 0.59 | 1.5231 | 54.456 | Optical filter OF |
| IMA | ∞ | 0.05 | 1.585 | 29.909 | |

Table 6 is related parameters of an aspherical surface of the image side surface S10 of the third lens L3 and the image side surface S13 of the fifth lens L5 in Table 5.

TABLE 6

| Surface | K | E4 | E6 | E8 | E10 | E12 |
|---|---|---|---|---|---|---|
| S10 | 0 | 0.000808197 | −1.50E−05 | 2.90E−07 | −3.44E−09 | 1.88E−11 |
| S13 | 0 | −0.001467412 | 3.14E−05 | −8.08E−07 | 1.26E−08 | −8.71E−11 |

For the lens assembly 30 of the third embodiment, the total track length (TTL) which is from the object side of the first lens L1 to the image side IMA along an optical axis OA is 33.61 mm, the effective focal length (EFL) is 10 mm, the back focal length (BFL) which is from the image side surface of the fifth lens L5 to the imaging side IMA along the optical axis OA is 1.289 mm, the field of view (FOV) is 58 mm, the image height on the image plane of the lens assembly (IMG (H), radius) is 4.7 mm, a $f_1$ which is an effective focal length of the first lens L1 is −46.594 mm, a $f_2$ which is an effective focal length of the second lens L2 is 20.08 mm, $f_3$ which is an effective focal length of the third lens L3 is 13.43 mm, $f_{45}$ which is an effective focal length of the combination of the fourth lens L4 and the fifth lens L5 is −14.583 mm. It can be understood that, in the third embodiment, $$\left|\frac{f_1}{EFL}\right| = 4.659, \left|\frac{f_{45}}{EFL}\right| = 1.458, \frac{IMG(H)}{f_\#} = 1.421, \frac{f_1}{f_{45}} = 3.195,$$

and CRA<1.07 degree, and the imaging side IMA is within 0.9 image heights, therefore, the characteristics of the lens assembly 30 of the third embodiment satisfy the above conditional expressions (1) to (5), the lens assembly 30 has a characterized of the miniaturization, wide viewing angle, and telecentric optical design.

Further, in the third embodiment, it is known from $$\left|\frac{f_{45}}{EFL}\right| = 1.458$$

that the cemented lens which are cemented by the fourth lens L4 and the fifth lens L5 can exerts a good short-focus effect. In addition, in the third embodiment, it is known from $$\frac{IMG(H)}{f_\#} = 1.421$$

that the lens assembly 30 of the third embodiment has a good wide viewing angle characteristic. It can be seen from CRA<1.07 degree that the value of CRA is the smallest compared with other embodiments, that is, the lens assembly 30 of the third embodiment is closest to the telecentric optical design compared with other embodiments, that is, the lens assembly 30 can display an image with better brightness and color uniformity.

Figure 4A:
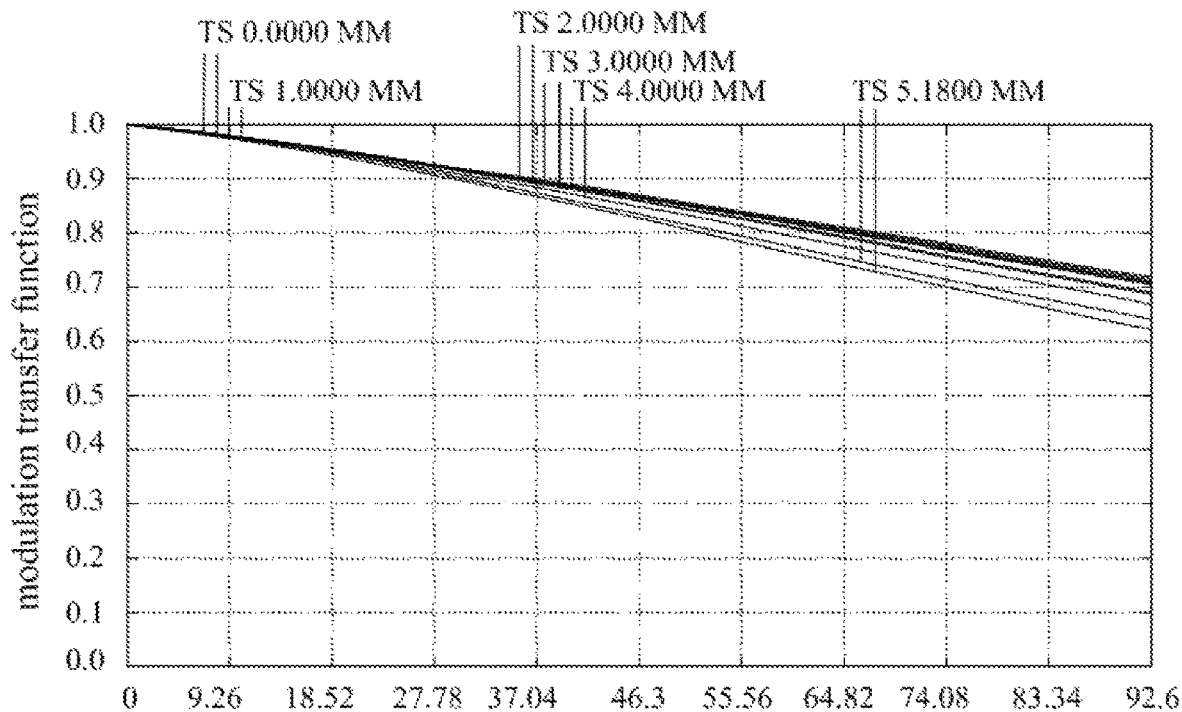
FIGS. 4A and 4B are a modulation transfer function (MTF) diagram and a lateral color diagram of a lens assembly in accordance with the third embodiment of the present disclosure, respectively.
Figure 4B:
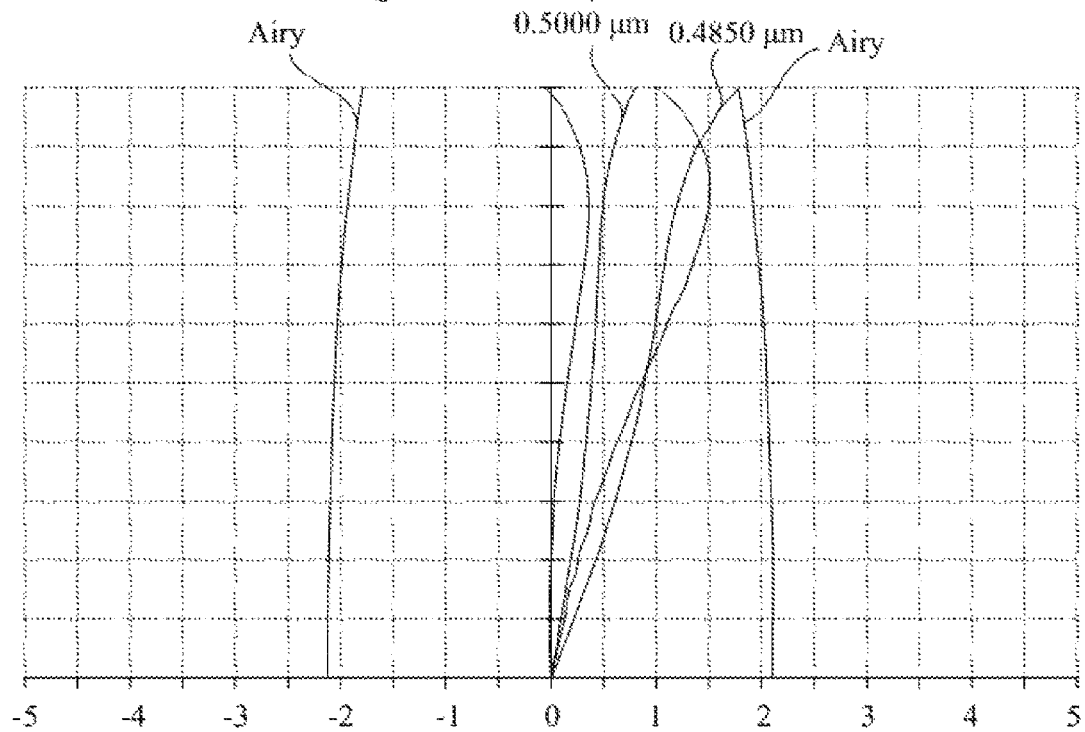

By the above arrangements of the lenses, the lens assembly 30 of the third embodiment can meet the requirements of optical performance as seen in FIGS. 4A-4B, wherein FIG. 4A shows a modulation transfer function (MTF) diagram of the lens assembly 30 of the third embodiment and FIG. 4B shows a lateral color diagram of the lens assembly 30 of the third embodiment.

In FIG. 4A, this is a zero-symmetric system, and only the portion of the modulation transfer function whose value is positive is shown in the figure, and the portion where the value is negative is not shown. It should be noted that the higher the value (vertical axis) of the modulation transfer function, the better the resolution effect. As can be seen from FIG. 4A, the lens assembly 30 of the third embodiment has a wavelength range of 0.4861 μm to 0.6563 μm, in the direction of the tangential (abbreviated as "T" in the figure) and the sagittal (abbreviated as "S" in the figure) respectively, the height of the field of view is 0.0000 mm, 1.0000 mm, 2.0000 mm, 3.0000 mm, 4.0000 mm and 5.1800 mm, and the modulation transfer function with a spatial frequency between 0 lp/mm and 92.6 lp/mm is between 0.6 and 1.0. Further, in FIG. 4B, the line graphs on the left and right sides are the ranges calculated by the system simulation (−2.5 μm to 2.5 μm), and the horizontal axis indicates the state in which the plane colors are separated. As can be seen from FIG. 4B, the lens assembly 30 of the third embodiment has a wavelength of 0.587562 μm as a reference wavelength, the lateral chromatic aberration of 0.5000 μm and 0.4850 μm of a light with the height of the field of view between 0 mm and 6 mm is between −2.5 μm and 2.5 μm. Obviously, the lateral chromatic aberration of the lens assembly 30 of the third embodiment can be corrected effectively, and the image resolution can meet the requirements, thereby capable of obtaining good optical performance.

In summary, in the present disclosure, a better resolution effect can be obtained by employing a front aperture lens and a first lens L1 having a negative refractive power instead of a first lens having positive refractive power of the prior art. Furthermore, in the present disclosure, by providing a cemented lens cemented of a fourth lens L4 and a fifth lens L5, not only the dispersion can be effectively eliminated, but also the telecentric optical path of the optical system can be appropriately adjusted, thereby effectively shortening the total length of the optical system, then the lens assembly 10, 20 and 30 are to achieve the effect of a short focus, so that the lens assembly 10, 20 and 30 can be miniaturized. In addition, the lens assembly 10, 20 and 30 of the present disclosure conforms to the conditions:

$$1.2 \le \frac{IMG(H)}{f\#} \le 1.5,$$

whereby the design enables the lens assembly 10, 20 and 30 have a wide viewing angle. Moreover, the lens assembly 10, 20 and 30 of the present disclosure conforms to the conditions: CRA≤1.4 degree, whereby the design can realize the characteristic that the lens assembly 10, 20 and 30 has a telecentric optical design, that is, the lens assembly 10, 20 and 30 can display an image with better brightness and color uniformity.

While the present disclosure has been described by way of example and in terms of embodiment, it is to be understood that the present disclosure is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A lens assembly, in sequence from an object side to an image side along an optical axis, comprising:
    a first lens which is a meniscus lens with negative refractive power;
    a second lens having positive refractive power;
    a third lens having positive refractive power and comprising a convex surface facing the image side;
    a fourth lens having positive refractive power, and
    a fifth lens having negative refractive power and comprising a concave surface facing the image side, wherein the fourth lens and the fifth lens are cemented to form a cemented lens with negative refractive power; and
    wherein the lens assembly satisfies:

$$3.3 \le \left| \frac{f_1}{EFL} \right| \le 4.7$$

wherein $f_1$ is an effective focal length of the first lens, and EFL is an effective focal length of the lens assembly.

2. The lens assembly as claimed in claim 1, wherein the lens assembly comprises an aperture and the aperture disposed between the object side and the first lens.

3. The lens assembly as claimed in claim 2, wherein the first lens comprises a concave surface facing the object side and a convex surface facing the image side.

4. The lens assembly as claimed in claim 2, wherein the second lens comprises a convex surface facing the object side and another convex surface facing the image side.

5. The lens assembly as claimed in claim 1, wherein the third lens comprises a convex surface facing the object side.

6. The lens assembly as claimed in claim 1, wherein the fourth lens comprises a convex surface facing the object side.

7. The lens assembly as claimed in claim 6, wherein the fourth lens comprises another convex surface facing the image side, and the fifth lens includes a concave surface facing the object side.

8. The lens assembly as claimed in claim 1, wherein the second lens comprises a plane surface facing the object side and a convex surface facing the image side.

9. The lens assembly as claimed in claim 8, wherein the first lens comprises a concave surface facing the object side and a convex surface facing the image side, the third lens comprises a convex surface facing the object side, and the fourth lens comprises a convex surface facing the object side.

10. The lens assembly as claimed in claim 9, wherein the fourth lens comprises another convex surface facing the image side, and the fifth lens comprises a concave surface facing the object side.

11. A lens assembly, in sequence from an object side to an image side along an optical axis, comprising:
    a first lens which is a meniscus lens with negative refractive power;
    a second lens having positive refractive power;
    a third lens having positive refractive power and comprising a convex surface facing the image side;
    a fourth lens having positive refractive power, and
    a fifth lens having negative refractive power and comprising a concave surface facing the image side, wherein the fourth lens and the fifth lens are cemented to form a cemented lens with negative refractive power; and
    wherein the lens assembly satisfies:

CRA ≤1.4 degree wherein the CRA is a maximum angle of a chief ray angle of an image height on an image plane from an optical axis.

12. The lens assembly as claimed in claim 1, wherein the lens assembly satisfies:

$$1.2 \le \frac{IMG(H)}{f_\#} \le 1.5$$

wherein IMG(H) is an image height on the image plane of the lens assembly, and $f_\#$ is a F-number of the lens assembly.

13. The lens assembly as claimed in claim 8, wherein the lens assembly satisfies:

$$1.7 \le \frac{f_1}{f_{45}} \le 3.2$$

wherein $f_1$ is an effective focal length of the first lens, and $f_{45}$ is an effective focal length of the cemented lens, and the cemented lens are cemented by the fourth lens and the fifth lens.

14. The lens assembly as claimed in claim 8, wherein the lens assembly satisfies:

CRA ≤1.4 degree wherein the CRA is a maximum angle of a chief ray angle of an image height on an image plane from an optical axis.

15. The lens assembly as claimed in claim 1, wherein the lens assembly satisfies:

$$1.4 \leq \left|\frac{f_{45}}{EFL}\right| \leq 2$$

wherein $f_{45}$ is an effective focal length of the cemented lens, and the cemented lens is cemented by the fourth lens and the fifth lens, and EFL is an effective focal length of the lens assembly.

16. The lens assembly as claimed in claim 11, wherein the lens assembly satisfies:

$$3.3 \leq \left|\frac{f_1}{EFL}\right| \leq 4.7,$$

wherein $f_1$ is an effective focal length of the first lens, and EFL is an effective focal length of the lens assembly.

17. The lens assembly as claimed in claim 8, wherein the lens assembly satisfies:

$$1.2 \leq \frac{IMG(H)}{f_\#} \leq 1.5$$

wherein IMG(H) is an image height on the image plane of the lens assembly, and $f_\#$ is a F-number of the lens assembly.

18. The lens assembly as claimed in claim 8, wherein the lens assembly satisfies:

$$1.4 \leq \left|\frac{f_{45}}{EFL}\right| \leq 2$$

wherein $f_{45}$ is an effective focal length of the cemented lens, and the cemented lens are cemented by the fourth lens and the fifth lens, and EFL is an effective focal length of the lens assembly.

19. A lens assembly, in sequence from an object side to an image side along an optical axis, comprising:
   a first lens which is a meniscus lens with negative refractive power;
   a second lens having positive refractive power;
   a third lens having positive refractive power and comprising a convex surface facing the image side;
   a fourth lens having positive refractive power, and
   a fifth lens having negative refractive power and comprising a concave surface facing the image side, wherein the fourth lens and the fifth lens are cemented to form a cemented lens with negative refractive power; and
   wherein the lens assembly satisfies:

$$1.7 \leq \frac{f_1}{f_{45}} \leq 3.2$$

wherein $f_1$ is an effective focal length of the first lens, and $f_{45}$ is an effective focal length of the cemented lens, and the cemented lens are cemented by the fourth lens and the fifth lens.

20. The lens assembly as claimed in claim 19, wherein the lens assembly satisfies:

$$3.3 \leq \left|\frac{f_1}{EFL}\right| \leq 4.7$$

wherein $f_1$ is an effective focal length of the first lens, and EFL is an effective focal length of the lens assembly.

* * * * *